United States Patent [19]

Todd

[11] Patent Number: 4,486,793
[45] Date of Patent: Dec. 4, 1984

[54] REDUCTION OF CROSSTALK EFFECTS IN MODULATED AUDIO SIGNALS CARRIED IN ADJACENT TRACKS OF RECORDED MEDIA

[75] Inventor: Craig C. Todd, Muir Beach, Calif.

[73] Assignee: Dolby Laboratories Licensing Corporation, San Francisco, Calif.

[21] Appl. No.: 399,235

[22] Filed: Jul. 19, 1982

[51] Int. Cl.³ .......................... G11B 5/04; G11B 15/02
[52] U.S. Cl. ......................................... 360/30; 360/22
[58] Field of Search .................. 360/8, 22, 29, 30, 55, 360/33; 369/97, 61

[56] References Cited

U.S. PATENT DOCUMENTS

| | | | |
|---|---|---|---|
| 3,222,459 | 12/1965 | Drapkin | 369/61 |
| 3,234,323 | 2/1966 | Kihara | 360/22 |
| 4,322,746 | 3/1982 | Oguino | 369/61 |
| 4,425,585 | 1/1984 | Sekimoro et al. | 360/20 |

Primary Examiner—Vincent P. Canney
Attorney, Agent, or Firm—Majestic, Gallagher, Parsons & Siebert

[57] ABSTRACT

This invention reduces crosstalk interference components without a significant increase in recorded bandwidth of the modulated audio signals and without a significant degradation of the signal-to-noise ratio of the reproduced audio signals. According to the invention, the nominal carrier frequency of the modulated audio signals in adjacent tracks or scans is offset by an amount sufficient to shift the crosstalk interference components outside the desired audio pass band for substantially all modulating amplitudes and frequencies. At the same time, the modulated audio frequency spectra of the adjacent tracks substantially overlap so that additional overall bandwidth requirements are minimized. A satisfactory offset from track to track is in the order of twice the maximum audio response frequency. As the offset is reduced or as occasional high frequency high amplitude audio occurs in adjacent tracks, crosstalk distortion components will tend to appear beginning at the high frequencies. Such crosstalk interference can be further reduced by the use of frequency dependent compressor-expander noise reduction because of the tendency of the interference to locate in one part of the audio band rather than across the entire audio band as in the case of no track-to-track carrier offset.

13 Claims, 13 Drawing Figures

REDUCTION OF CROSSTALK EFFECTS IN MODULATED AUDIO SIGNALS CARRIED IN ADJACENT TRACKS OF RECORDED MEDIA

BACKGROUND OF THE INVENTION

The present invention relates to the recording and reproduction of audio signals that are modulated onto a plurality of adjacent or juxtaposed tracks on a recording medium. More particularly, the invention relates to the reduction of crosstalk interference components from one or more adjacent tracks during the reproduction of a desired track.

Although the invention will be described in the context of a helical scan video tape recorder system employing frequency modulated audio recorded along with frequency modulated video in a series of slant tracks along an elongated magnetic tape, the invention is applicable to other recording media in which audio signals are frequency, phase or amplitude modulated on to adjacent or juxtaposed tracks or bands.

Nearly all video tape recorders have employed the technique of frequency modulating video signals and recording them, using a head or heads carried by a high-speed rotating disc or drum, in tracks generally crosswise or at a slant angle to the longitudinal movement of the magnetic tape. Generally, audio information has been recorded longitudinally along the tape edge by a fixed head without using any modulation or encoding.

As video tape recorders have advanced in design smaller and smaller width tapes have been employed, slower linear speeds have been used and the spacing between tracks has been reduced such that each is directly adjacent another, causing video crosstalk from track to track. In two-head devices where each head reads every other track, video crosstalk has been reduced by using different head azimuths for adjacent tracks. However, the staggered azimuth technique is less effective for suppressing crosstalk in audio signals recorded along with video signals on the same tracks but at a frequency lower than the video signal spectrum. Thus, in video tape recorder systems in which it is desired to record audio signals by scanning them on to the slant tracks along with the video signals (in place of or in addition to the longitudinal audio track), it is necessary to employ further techniques to suppress audio crosstalk from track to track.

Before summarizing the way in which the present invention solves the above defined problem, it is useful to refer generally to a few basic principles of frequency modulation.

In frequency modulation, the ratio of the frequency deviation, $f_d$, of the carrier, $f_c$, to the modulating frequency, $f_m$, is known as the modulation index, m. That is, $$m = (f_d/f_m)$$

FIGS. 1a through 1d show the sidebands resulting from various values of m. Consider the simplest case of a low value, $m = \frac{1}{2}$. There are then only two sidebands, one each side of the carrier at frequencies $f_c +/- f_m$. When a signal containing these three frequency components (in appropriate phase relationship) is applied to an FM demodulator, the output will be a sine-wave at frequency $f_m$.

FIG. 2a shows a signal in which only one of the sidebands is present; this can be considered a single sideband carrier modulated at frequency $f_m$ with a combination of frequency and amplitude modulation. If this signal is passed through a limiter to remove the amplitude variations (as is usual in FM systems), a second sideband appears (and the first is diminished in amplitude); see FIG. 2b. If this limited signal is fed to the demodulator, the output will again be a sine-wave of frequency $f_m$. Thus any interfering signal, which can be considered as the equivalent of a single sideband will, after limiting and FM demodulation, give rise to an output at a frequency equal to the spacing between the carrier and the interfering signal. If the single sideband is large enough, limiting to remove AM will introduce the further sideband as above, giving a spectrum with the appearance of FIG. 2b, but with the wrong amplitude and phase relationships for demodulation to deliver a pure sine-wave. In this case the output will be a distorted wave with a fundamental frequency equal to the spacing, and harmonics (both even and odd) dependent on the amplitude of the single sideband. This interference is proportional to $$f_i(a \cos 2\pi f_i t - a^2 \cos 4\pi f_i t + a^3 \cos 6\pi f_i t - \ldots)$$

where $f_i$ is the separation between the carrier and the single sideband, and a is the ratio of the amplitudes of the single sideband to the carrier.

It is apparent that the magnitude of this is directly proportional to $f_i$, and that for small values of a, the fundamental frequency $f_i$ is dominant. For example, if $a = 0.1$, the wave contains 0.01 or 1% of 2nd harmonic, and 0.001 or 0.1% of 3rd.

Suppose frequency modulation with a carrier $f_c$ is used in a scanned system, and that there is crosstalk between scans. In the absence of modulation but presence of slight drift in $f_c$ or slight variations in writing or reading speed, the crosstalk from an adjacent scan can be considered as a single sideband whose spacing from the $f_c$ of the current scan is small. Hence, after demodulation, the interference caused by the crosstalk will consist of low frequencies, and their magnitude will be low. However, when the carrier, either for the current scan or the adjacent one, or both, is modulated, the crosstalk can be considered as many single sidebands (that is, not appearing as pairs of sidebands symmetrically placed each side of the carrier), and the demodulated inerference will contain many frequencies.

If the deviation of the carriers is large compared with audio frequencies, the demodulated interference will cover the whole audio spectrum. However, it appears that the magnitude of each spectral line in the demodulated interference will still be proportional to its frequency, and thus higher frequencies will be more significant. In a practical scanned system in which the crosstalk from preceding and/or succeeding scans using the same nominal carrier frequency $f_c$ is at least 10 dB down compared to the current scan, the interference in the absence of modulation is likely to be negligible, since it will be a very low amplitude signal at a few tens of Hz where the human ear is insensitive, but the non-linear distortion caused by the interferences in the presence of modulation is likely to be intolerable. The interference extends across the whole audio frequency range because the spectrum of the FM signal on the current scan overlaps (in fact substantially coincides) with that leaking from adjacent scans.

The interference from one scan to another is similar to that caused by the multipath propagation of over-the-air FM signals. Rigorous analyses of FM interference is presented in Chapter 11 of *Modulation, Noise and Spectral Analysis* by Philip F. Panter, McGraw-Hill, San Francisco, 1965.

It is instructive to consider the addition of a compression-expansion noise reduction system. As shown above, a sideband in the interfering crosstalk gives rise to a demodulated tone whose amplitude is proportional to the amplitude of the sideband and to the frequency spacing between the sideband and the wanted carrier. In general, as the percentage modulation is increased, the amplitude of the sideband increases. Hence compression, which increases the percentage modulation for low output levels, will automatically also increase the demodulated interference. Expansion will reduce it again, but only to about the same level as it would have had without compansion, since the interference is usually in the same part of the audio spectrum as the modulating signal. Therefore, if the nonharmonic distortion resulting from interference is intolerable without noise reduction it is unlikely to be tolerable with it. Thus, the addition of a compression-expansion noise reduction system is, in itself, not helpful in solving the problem of interfering crosstalk.

In seeking a solution to the crosstalk interference problem, a practical constraint in a video tape recorder system, and no doubt in other recording systems, is that only a limited bandwidth is available for recording the frequency modulated audio signal. For example, in the case of a "color under" system, the video chrominance information is modulated on to a carrier at a frequency below the main frequency modulated luminance information. A relatively small portion of the recordable frequency spectrum is available for the frequency modulated audio.

It is therefore an object of the present invention to reduce crosstalk interference components from one or more adjacent tracks in recording and reproducing systems in which audio signals are modulated and recorded on to a plurality of adjacent tracks on a recording medium.

It is a further object to reduce crosstalk interference components from one or more adjacent tracks in videotape recording and reproducing systems in which audio signals are modulated on to a carrier and recorded along with modulated video signals on to a plurality of adjacent tracks or scans on a recording mediums.

It is yet a further object of the present invention to reduce crosstalk interference components from one or more adjacent tracks in recording and reproducing systems in which audio signals are modulated and recorded on to a plurality of adjacent tracks on a recording medium such that the reduction in crosstalk interference components is achieved without a significant increase in recorded bandwidth of the modulated audio signals and without a significant degradation of the signal-to-noise ratio of the reproduced audio signals.

These and other objects of the invention will be better understood as the following description is read and understood in connection with the drawings.

SUMMARY OF THE INVENTION

In accordance with the teachings of the present invention, the nominal carrier frequency of the modulated audio signals in adjacent tracks or scans is offset by an amount sufficient to shift the crosstalk interference components outside the desired audio pass band for substantially all modulating amplitudes and frequencies. At the same time, the modulated audio frequency spectra of the adjacent tracks substantially overlap such that additional overall bandwidth requirements are minimized.

The minimum amount of carrier frequency offset is determined by the desired maximum audio response frequency and the amount of distortion that the system designer is willing to tolerate. An offset less than the maximum audio response frequency is clearly undesirable because an audible beat note results from the carriers. A satisfactory offset from track to track is in the order of twice the maximum audio response frequency (e.g., a 30 kHz offset for a system having a nominal response up to 15 kHz). As the offset is reduced or as occasional high frequency, high amplitude audio occurs in adjacent tracks, crosstalk distortion components will tend to appear beginning at high frequencies. Such crosstalk interference can be further reduced by the use of frequency dependent compressor-expander noise reduction because of the tendency of the interference to locate in one part of the audio band rather than across the entire audio band as in the case of no track-to-track carrier offset. Thus, employing noise reduction that acts at high frequencies allows a smaller carrier offset for a given amount of crosstalk distortion or reduces crosstalk distortion for a given carrier offset. Instead of or in addition to noise reduction, high frequency pre-emphasis and de-emphasis may also be helpful. The offset may be constant or variable. In the simplest embodiment, odd-numbered scans employ a carrier frequency $f_1$, and even-numbered $f_2$, where $f_2 - f_1 = f_o$, the fixed offset frequency. Assuming crosstalk from adjacent scans is symmetrical (that is, equal from the previous and the succeeding scans), and in the absence of modulation, the output will contain two equal interfering components, each in the region of $f_o$ and therefore at the top of or desirably beyond the audio spectrum. In a further embodiment there may be three carrier frequencies, $f_1$, $f_2$, $f_3$, each used on every third scan, and related so that the resulting interference frequencies $f_1 - f_2$, $f_2 - f_3$, $f_3 - f_1$, are all beyond the audio range and are not close enough to each other to give rise to audible intermodulation components due to non-linearities.

BRIEF DESCRIPTION OF THE DRAWINGS

FIG. 3b is a signal waveform useful in understanding FIG. 3a.

FIG. 5b is a timing diagram useful in understanding the operation of the embodiment of FIG. 5a.

DESCRIPTION OF THE PREFERRED EMBODIMENTS

In its preferred embodiment, the present invention is embodied in a helical scan video tape recorder/reproducer having two or more heads carried by the helical scanner which record on successive tracks or scans not only the conventional video signal information but also one or more modulated audio signals. For example, a monophonic audio signal having a maximum upper frequency of about 15 kHz is frequency modulated on a carrier having a nominal carrier frequency of 1.4 MHz and a deviation of $+/-100$ KHz. A second distinct carrier can be used in the region of 1.4 MHz, for example, to provide for two channel or stereo recording. The second audio channel carrier is spaced from the first carrier sufficiently to avoid undesirable co-interference. Additional audio channels can be modulated and recorded on further distinct and sufficiently spaced carriers. Depending on the available bandwidth of the video tape recorder, the use of one or more modulated audio carriers may require narrowing of the video signal bandwidth to provide adequate space in the recordable spectrum.

The tracks laid down by the recorder are directly adjacent to each other and are scanned in succession by the first and second heads, which have different azimuths with respect to each other. In playback, each head is centered along a particular track, but also overlaps to some extent the adjacent tracks on both sides. The frequency modulated audio from the adjacent tracks is in the order of 16 dB down from that of the desired track.

The nominal bandwidth of an FM signal is roughly the peak-to-peak deviation plus twice the highest modulating frequency. Thus, for an audio band extending to 15 kHz, the approximate bandwidth in this exemplary embodiment is 230 kHz before introducing any offset. If a track-to-track offset of 30 kHz is chosen, then the bandwidth required increases to 260 kHz. If the additional bandwidth is unavailable, then the deviation can be reduced to $+/-85$ kHz to retain the original approximate bandwidth, while suffering only about 1.5 dB degradation in signal-to-noise ratio.

In reproducing audio from such a system it is necessary to carry out switching at the end of each scan so that demodulation of the audio centered on a new carrier frequency commences correctly at the beginning of the new scan. There are several methods possible; these are explained in terms of two carrier frequencies with a fixed offset between them, but can be extended to cover other numbers of carriers or variable offsets.

Figure 1A:
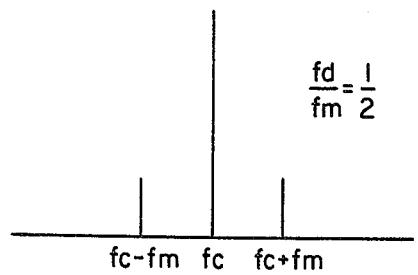
FIGS. 1a through 1d show exemplary spectral distributions of an FM wave for several values of modulation index, holding the modulating frequency $f_m$ constant.
Figure 1B:
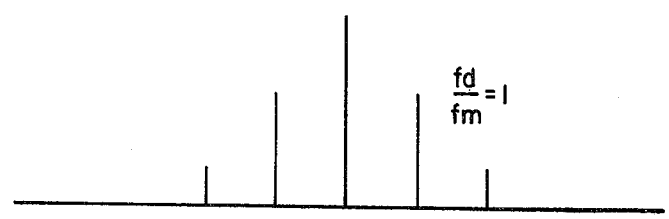
Figure 1C:
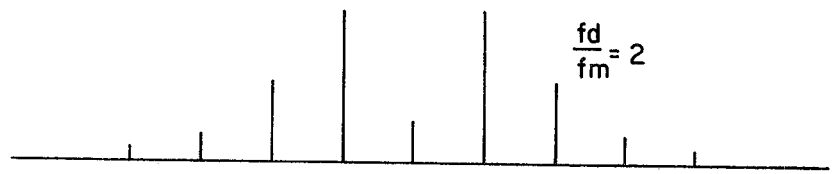
Figure 1D:
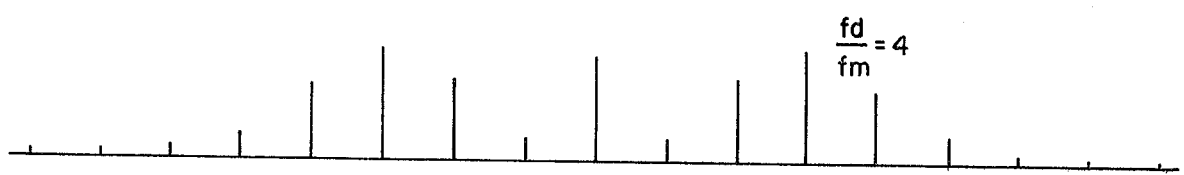
Figures 2A, 2B:
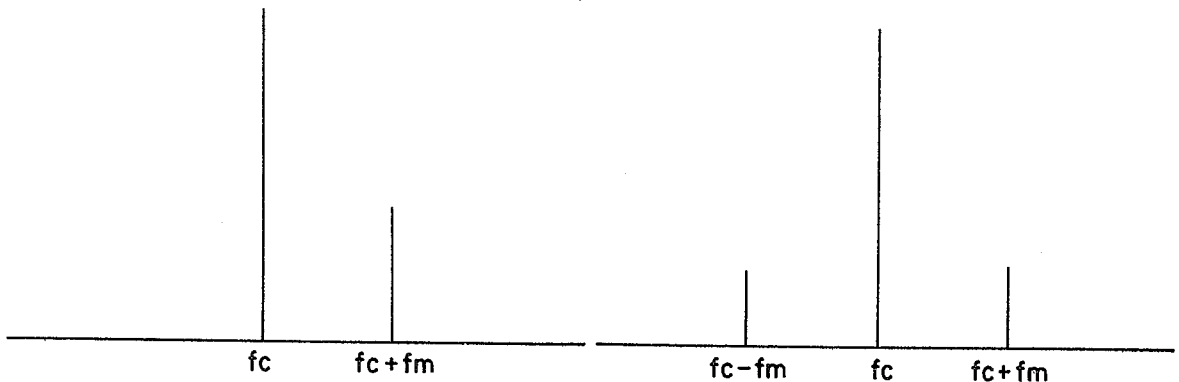
FIGS. 2a and 2b show exemplary spectral distributions of a combination AM and FM single sideband wave before and after limiting, respectively.
Figure 3A:
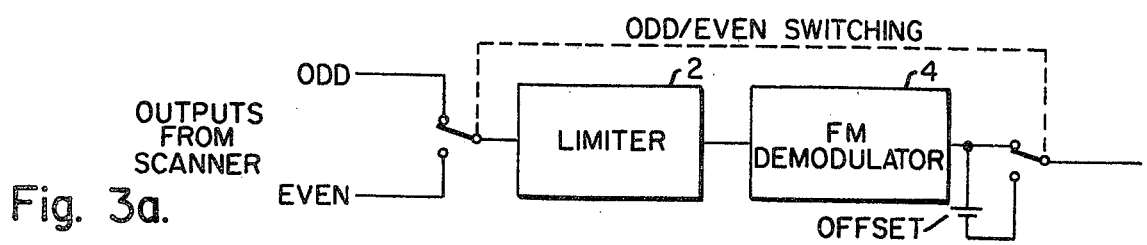
FIG. 3a is a block diagram of a video tape playback system embodying the present invention.
Figure 3B:
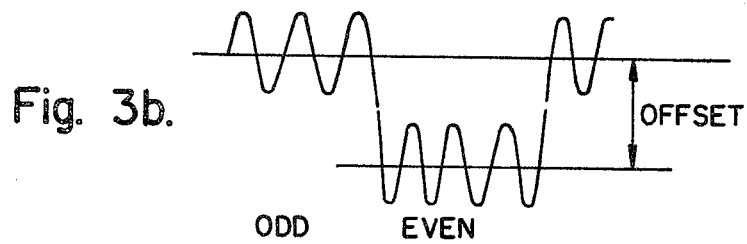

FIG. 3a shows the simplest demodulation scheme. The current reproduced scan is fed via a limiter 2 to an FM demodulator 4. Since the carrier frequency alternates between $f_1$ and $f_2$, the output of the demodulator (FIG. 3b) contains the wanted audio plus an unwanted square-wave which can theoretically be removed by switching in and out a dc offset equal to the peak-to-peak amplitude of the square-wave. Clearly, there would be practical difficulties in this approach.

Figure 4:
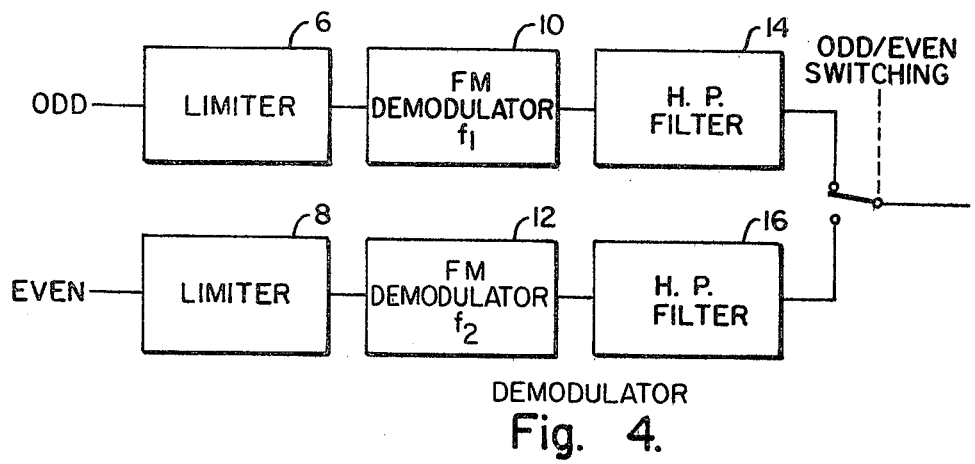
FIG. 4 is a block diagram of a further videotape playback system embodying the present invention.

FIG. 4 shows an alternative method. Odd and even numbered reproduced scans ae fed to separate limiters 6 and 8 and demodulators 10 and 12 tuned to the appropriate carrier frequencies. Switching is carried out between the outputs of the demodulators. Small discrepancies in the quiescent output voltages of the demodulators are removed by high-pass filters (A.C. couplings) 14 and 16.

However, each demodulator in FIG. 4 receives signal only during the appropriate scan, and its output voltage in the absence of an input signal will usually drift away from the mean level during the scan. Hence, a transient will often occur at the output of each demodulator at the beginning of its scan. These transients will be extended by the A.C. couplings and will appear at the audio output after scan switching.

Figure 5A:
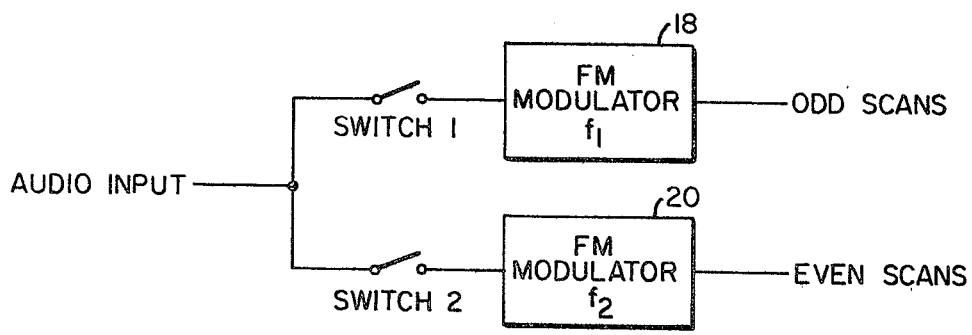
FIG. 5a is a block diagram of a portion of a video tape recording system embodying the present invention.
Figure 5B:
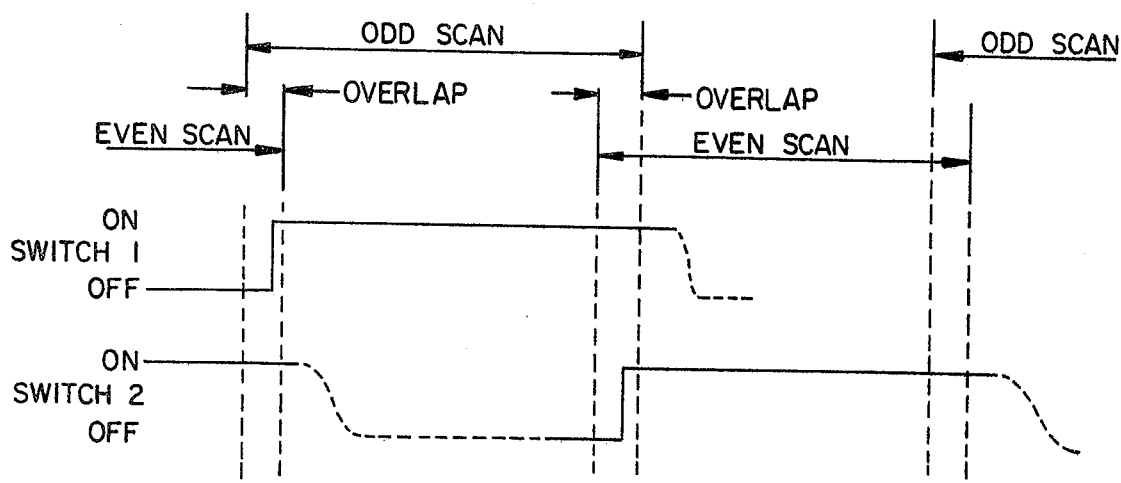
Figure 5C:
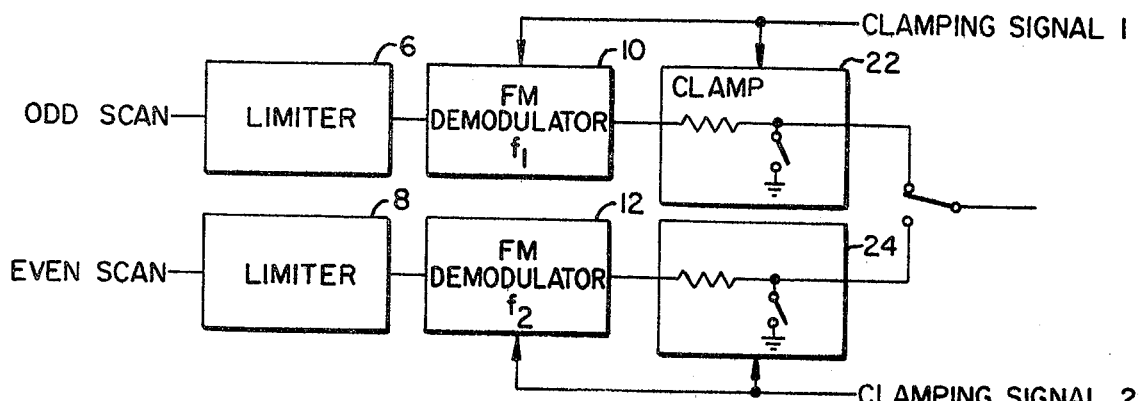
FIG. 5c is a block diagram of a portion of a videotape playback system embodying the present invention.

In practical scanned systems, there is usually a small period of overlap during which both odd and even numbered scans are recorded. FIGS. 5a and 5c show a means of eliminating the switching transients. During recording, the odd scan FM modulator 18 is not fed with a signal for the first part of the overlap at the beginning of the odd scan; therefore unmodulated carrier is recorded. Just before the even scan ends (that is, towards the end of the overlap), audio is switched to the odd scan modulator input, and the modulation continues until after the end of the odd scan. The even scan modulator 20 is treated similarly. FIG. 5b is a timing diagram illustrating the switching sequence.

Figure 5D:
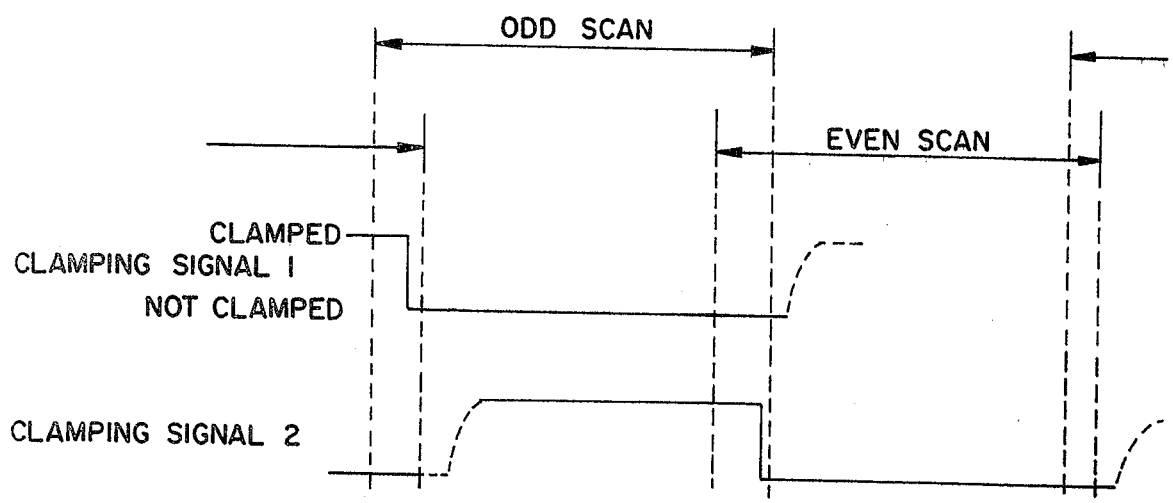
FIG. 5d is a timing diagram useful in understanding the operation of the embodiment of FIG. 5c.

During reproduction (FIG. 5c) the demodulator outputs are clamped to ground (blocks 22, 24) during the beginning of the overlap period, when unmodulated carrier is reproduced. Each demodulator therefore has time to settle to the appropriate quiescent output potential before audio commences. Just before the overlap period ends, the demodulator is allowed to reproduce the now modulated carrier, and is then ready to deliver audio to the output odd-even scan switch without a transient. The odd-even scan switch may in fact constitute a rapid fade between the demodulator outputs just at the end of the overlap. FIG. 5d is a timing diagram illustrating the switching sequence.

I claim:

1. A system in which audio signals modulated and recorded on a plurality of adjacent tracks produce undesired crosstalk interference signal components from one or more adjacent tracks when a desired track is played back comprising the method of offsetting the nominal carrier frequency of the modulated signals in adjacent tracks by an amount sufficient to shift the crosstalk interference signal components to at least the high frequency portion of the desired audio band or beyond while maintaining the modulated frequency spectra of the signals carried in adjacent tracks substantially overlapping.

2. The method of claim 1 in which the audio signals are frequency modulated.

3. The method of claim 2 wherein the nominal carrier frequencies are offset by a frequency at least as great as the maximum modulating frequency.

4. The method of claim 3 wherein the nominal carrier frequencies are offset by a frequency in the order of twice the maximum modulating frequency.

5. A system in which audio signals modulated and recorded on a plurality of adjacent tracks produce undesired crosstalk interference signal components from one or more adjacent tracks when a desired track is played back comprising means for offsetting the nominal carrier frequency of the modulated signals in adjacent tracks by an amount sufficient to shift the crosstalk interference signal components to at least the high frequency portion of the desired audio band or beyond while maintaining the modulated frequency spectra of the signals carried in adjacent tracks substantially overlapping.

6. The system of claim 5 in which the audio signals are frequency modulated.

7. The combination of claim 6 wherein the nominal carrier frequencies are offset by a frequency at least as great as the maximum modulating frequency.

8. The combination of claim 7 wherein the nominal carrier frequencies are offset by a frequency in the order of twice the maximum modulating frequency.

9. The combination of claim 5 wherein said means comprises first and second modulation means, each having a different nominal carrier frequency such that the difference in frequencies is the offset frequency.

10. The combination of claim 9 further comprising switch means for controlling the connection of audio signals to said modulators, and means for applying the modulation means output respectively to record alternate tracks, said means including first and second record head means for recording alternate tracks, the alternative track recording overlapping in time briefly at the start and finish of each track, and said switch means alternately switching the audio from the modulator associated with the ending track to the modulator associated with the starting track during the period of overlap.

11. The combination of claim 10 further comprising playback means receiving signals from said heads, said playback means including separate demodulation means and clamping means associated with each head, means for clamping the demodulation means associated with the head at the end of the track to a reference level during the overlap period and for unclamping it during the next overlap period, and means for selecting the unclamped demodulation means output during each overlap period.

12. A recorded video tape having a plurality of adjacent tracks, the tracks bearing modulated video information and modulated audio information, the carrier frequency of the modulated audio information being offset from one track to the next by an amount at least as great as the highest modulating frequency of the audio information and the modulated frequency spectra of the signals carried in adjacent tracks substantially overlapping.

13. The recorded video tape of claim 12 in which the tracks bear frequency modulated audio information.

* * * * *